(12) United States Patent
Al-Otoom et al.

(10) Patent No.: US 9,292,294 B2
(45) Date of Patent: Mar. 22, 2016

(54) DETECTION OF MEMORY ADDRESS ALIASING AND VIOLATIONS OF DATA DEPENDENCY RELATIONSHIPS

(71) Applicant: Intel Corporation, Santa Clara, CA (US)

(72) Inventors: Muawya M. Al-Otoom, Beaverton, OR (US); Paul Caprioli, Hillsboro, OR (US); Ryan Carlson, Hillsboro, OR (US); Ho-Seop Kim, Portland, OR (US); Omar Shaikh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 13/628,634

(22) Filed: Sep. 27, 2012

(65) Prior Publication Data
US 2014/0089271 A1    Mar. 27, 2014

(51) Int. Cl.
| | |
|---|---|
| G06F 9/312 | (2006.01) |
| G06F 9/38 | (2006.01) |
| G06F 9/44 | (2006.01) |
| G06F 9/30 | (2006.01) |
| G06F 7/00 | (2006.01) |
| G06F 17/30 | (2006.01) |

(52) U.S. Cl.
CPC .......... *G06F 9/3834* (2013.01); *G06F 9/30043* (2013.01); *G06F 9/3842* (2013.01); *G06F 9/44* (2013.01); *G06F 7/00* (2013.01); *G06F 17/30* (2013.01)

(58) Field of Classification Search
CPC . G06F 9/3834; G06F 9/30043; G06F 9/3004; G06F 9/3838; G06F 9/3855; G06F 9/30185; G06F 9/466–9/467; G06F 9/526; G06F 9/38; G06F 12/14–12/16; G06F 12/1009–12/1018; G06F 9/44552
See application file for complete search history.

(56) References Cited

U.S. PATENT DOCUMENTS

| | | | | |
|---|---|---|---|---|
| 6,618,803 | B1 * | 9/2003 | Hannum et al. | 712/225 |
| 8,112,604 | B2 * | 2/2012 | Robinson | 711/169 |
| 2007/0271450 | A1 * | 11/2007 | Doshi et al. | 712/245 |
| 2013/0262838 | A1 | 10/2013 | Al-Otoom et al. | |

FOREIGN PATENT DOCUMENTS

WO    2013085518    6/2013

* cited by examiner

*Primary Examiner* — Kenneth Kim
(74) *Attorney, Agent, or Firm* — Kenyon & Kenyon, LLP (57) ABSTRACT

Method and apparatus to efficiently detect violations of data dependency relationships. A memory address associated with a computer instruction may be obtained. A current state of the memory address may be identified. The current state may include whether the memory address is associated with a read or a store instruction, and whether the memory address is associated with a set or a check. A previously accumulated state associated with the memory address may be retrieved from a data structure. The previously accumulated state may include whether the memory address was previously associated with a read or a store instruction, and whether the memory address was previously associated with a set or a check. If a transition from the previously accumulated state to the current state is invalid, a failure condition may be signaled.

21 Claims, 6 Drawing Sheets

⟶ Alias Failure Conditions
502

--⟶ Harmless
504

DETECTION OF MEMORY ADDRESS ALIASING AND VIOLATIONS OF DATA DEPENDENCY RELATIONSHIPS

FIELD OF THE INVENTION

The present disclosure pertains to the field of processors and, in particular, to memory address alias detection techniques.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel.

In order to fully utilize the ability of computer systems to accomplish tasks in parallel, computer instructions may be reordered prior to the execution of the instructions. However, such reordering may result in data dependency relationship violations. Thus, the reordered code may need to be checked at run time to ensure that such violations do not occur. Consequently, there is a need for efficient ways to check reordered instructions to prevent data dependency relationship violations.

DESCRIPTION OF THE FIGURES

Embodiments are illustrated by way of example and not limitation in the Figures of the accompanying drawings.

DETAILED DESCRIPTION

In the following description, numerous specific details are set forth such as examples of specific hardware structures for storing/caching data, as well as placement of such hardware structures; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific uncore logic, specific memory controller logic, specific cache implementations, specific cache coherency protocols, specific cache algorithms, and specific operational details of microprocessors, have not been described in detail in order to avoid unnecessarily obscuring the present invention.

Embodiments may be discussed herein which efficiently detect violations of data dependency relationships. In an embodiment, a memory address associated with a computer instruction may be obtained. A current state of the memory address may be identified. The current state may include whether the memory address is associated with a read or a store instruction, and whether the memory address is associated with a set or a check. A previously accumulated state associated with the memory address may be retrieved from a data structure. The previously accumulated state may include whether the memory address was previously associated with a read or a store instruction, and whether the memory address was previously associated with a set or a check. If a transition from the previously accumulated state to the current state is invalid, a failure condition may be signaled.

In an embodiment, if the transaction is valid, the current state may be accumulated to the previously accumulated state in the data structure. In an embodiment, the transition may be determined as invalid if the previously accumulated state indicates that the memory address was previously associated with a store instruction and a set, and the current state indicates that the memory address is associated with a store instruction and a check. In an embodiment, the transition may be determined as invalid if the previously accumulated state indicates that the memory address was previously associated with a store instruction and a set, and the current state indicates that the memory address is associated with a load instruction and a check. In an embodiment, the transition may be determined as invalid if the previously accumulated state indicates that the memory address was previously associated with a load instruction and a check, and the current state indicates that the memory address is associated with a store instruction and a set. In an embodiment, the transition may be determined as invalid if the previously accumulated state indicates that the memory address was previously associated with a store instruction and a check, and the current state indicates that the memory address is associated with a load instruction and a set. In an embodiment, the transition may be determined as invalid if the previously accumulated state indicates that the memory address was previously associated with a load instruction and a set, and the current state indicates that the memory address is associated with a store instruction and a check.

Figure 1:
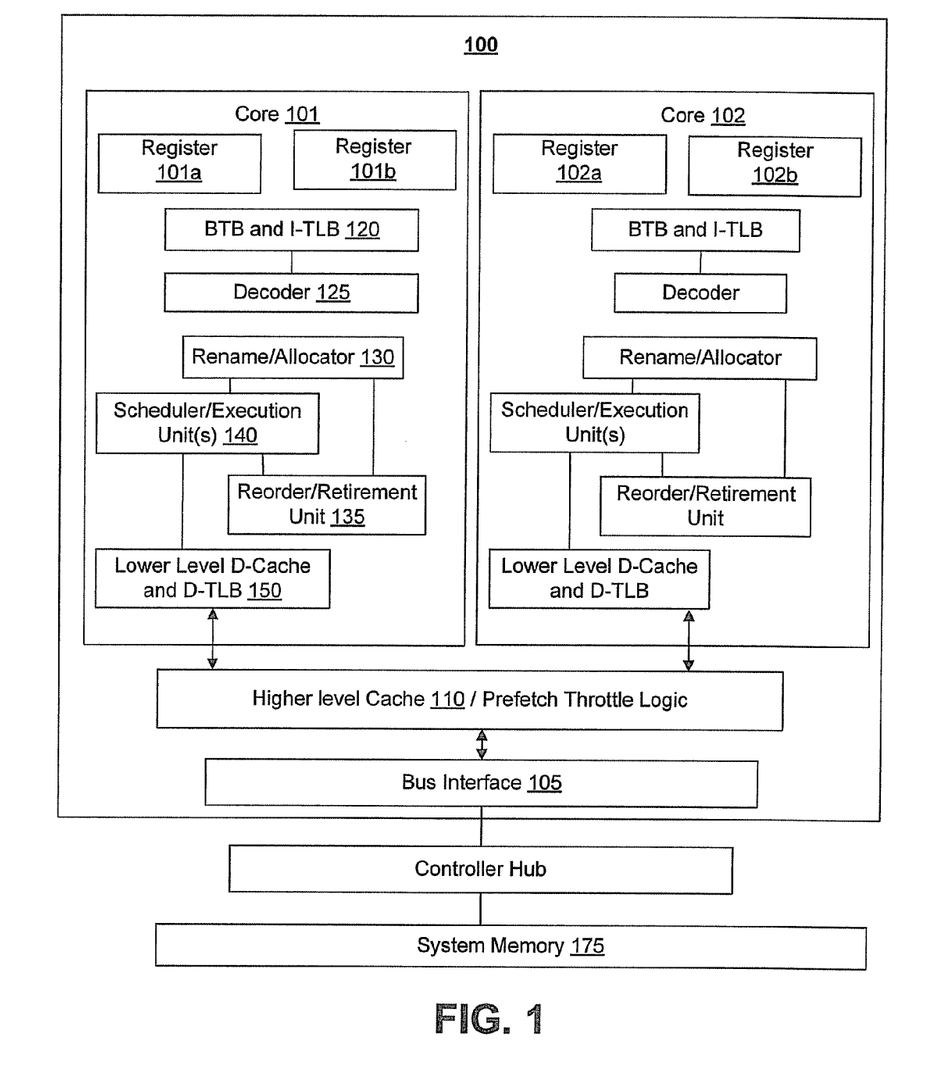
FIG. 1 illustrates a processor including multiple processing elements according to an embodiment.

Referring to FIG. 1, an embodiment of a processor including multiple cores is illustrated. Processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for these individual units and/or cores.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

Note that in the depicted embodiment, the controller hub and memory are illustrated outside of processor 100. However, the implementations of the methods and apparatus' described herein are not so limited. In fact, as more logic and devices are being integrated on a single die, such as System on a Chip (SOC), each of these devices may be incorporated on processor 100. For example in one embodiment, memory controller hub is on the same package and/or die with processor 100. Here, a portion of the core (an on-core portion) includes a controller hub for interfacing with other devices such as a controller hub. In the SOC environment, even more devices, such as the network interface, co-processors, and any other known computer devices/interface may be integrated on a single die or integrated circuit to provide small form factor with high functionality and low power consumption.

In one embodiment, processor 100 is capable of hardware transactional execution, software transactional execution, or a combination/hybrid thereof. A transaction, which may also be referred to as execution of a critical or atomic section/region of code, includes a grouping of instructions or operations to be executed as an atomic group. For example, instructions or operations may be used to demarcate or delimit a transaction or a critical section. These instructions may be part of a set of instructions, such as an Instruction Set Architecture (ISA), which are recognizable by hardware of processor 100, such as decoder(s) 125 described above. Often, these instructions, once compiled from a high-level language to hardware recognizable assembly language include operation codes (opcodes), or other portions of the instructions, that decoder(s) 125 recognize during a decode stage.

Typically, during execution of a transaction, updates to memory are not made globally visible until the transaction is committed. As an example, a transactional write to a location is potentially visible to a local thread; yet, in response to a read from another thread the write data is not forwarded until the transaction including the transactional write is committed. While the transaction is still pending, data items/elements loaded from and written to within a memory may be tracked. Once the transaction reaches a commit point, if conflicts have not been detected for the transaction, then the transaction is committed and updates made during the transaction are made globally visible. However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within or at least primarily through execution of software or code. In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the discussion. However, some structures, resources, and implementations may be disclosed for illustrative purposes. Yet, it should be noted that these structures and implementations are not required and may be augmented and/or replaced with other structures having different implementation details. Another execution technique closely related to transactional memory includes lock elison {often referred to as hardware lock elision (HLE)}. In this scenario, lock instruction pairs (lock and lock release) are replaced (either by a user, software, or hardware) with atomic start and end delimiting instructions. And the section of code between the lock instruction pairs is executed like a transaction.

As a combination, processor 100 may be capable of executing transactions using a hybrid approach (both hardware and software), such as within an unbounded transactional memory (UTM) system.

Any combination of conditions and scenarios may be considered invalidating for a transaction. Examples of factors, which may be considered for non-commit of a transaction, includes detecting a conflict to a transactionally accessed memory location, losing monitor information, losing buffered data, losing metadata associated with a transactionally accessed data item, and detecting an other invalidating event, such as an interrupt, ring transition, or an explicit user instruction.

In one embodiment, processor 100 is capable of executing a compiler, optimization, and/or translator code to compile application code to support transactional execution, as well as to potentially optimize application code, such as perform re-ordering. Here, the compiler may insert operations, calls, functions, and other code to enable execution of transactions, as well as provide software support for memory operation re-ordering.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization. The intersection of transactional execution and dynamic code compilation potentially results in enabling more aggressive optimization, while retaining necessary memory ordering safeguards.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Nevertheless, despite the execution environment and dynamic or static nature of a compiler; the compiler, in one embodiment, compiles program code to enable transactional execution and/or optimize sections of program code. Similar to a compiler, a translator, such as a binary translator, translates code either statically or dynamically to optimize and/or translate code. Therefore, reference to execution of code, application code, program code, an STM environment, or other software environment may refer to: (1) execution of a compiler program(s), optimization code optimizer, or translator either dynamically or statically, to compile program code, to maintain transactional structures, to perform other transaction related operations, to optimize code, or to translate code; (2) execution of main program code including transactional operations/calls, such as application code that has been optimized/compiled; (3) execution of other program code, such as libraries, associated with the main program code to maintain transactional structures, to perform other transaction related operations, or to optimize code; or (4) a combination thereof.

Often within software transactional memory (STM) systems, a compiler will be utilized to insert some operations, calls, and other code in-line with application code to be compiled, while other operations, calls, functions, and code are provided separately within libraries. This potentially provides the ability of the libraries distributors to optimize and update the libraries without having to recompile the application code. As a specific example, a call to a commit function may be inserted inline within application code at a commit point of a transaction, while the commit function is separately provided in an updateable library. And the commit function includes an instruction or operation, when executed, to reset speculative bits of a translation buffer, as described in more detail below. Additionally, the choice of where to place specific operations and calls potentially affects the efficiency of application code. As another example, binary translation code is provided in a firmware or microcode layer of a processing device. So, when binary code is encountered, the binary translation code is executed to translate and potentially optimize (including memory re-ordering) the code for execution on the processing device.

Hardware structures may be provided to support such optimization within transactional regions (critical sections), while ensuring valid execution when different virtual address pages are mapped to the same physical page. As a result, software optimizations, such as automatic vector widening (e.g. widening 128 bit vector instructions to 256 bit vector instructions), may be performed within atomic sections of code without the concern that the optimizations would result in invalid execution.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an uncore module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

Figure 2:
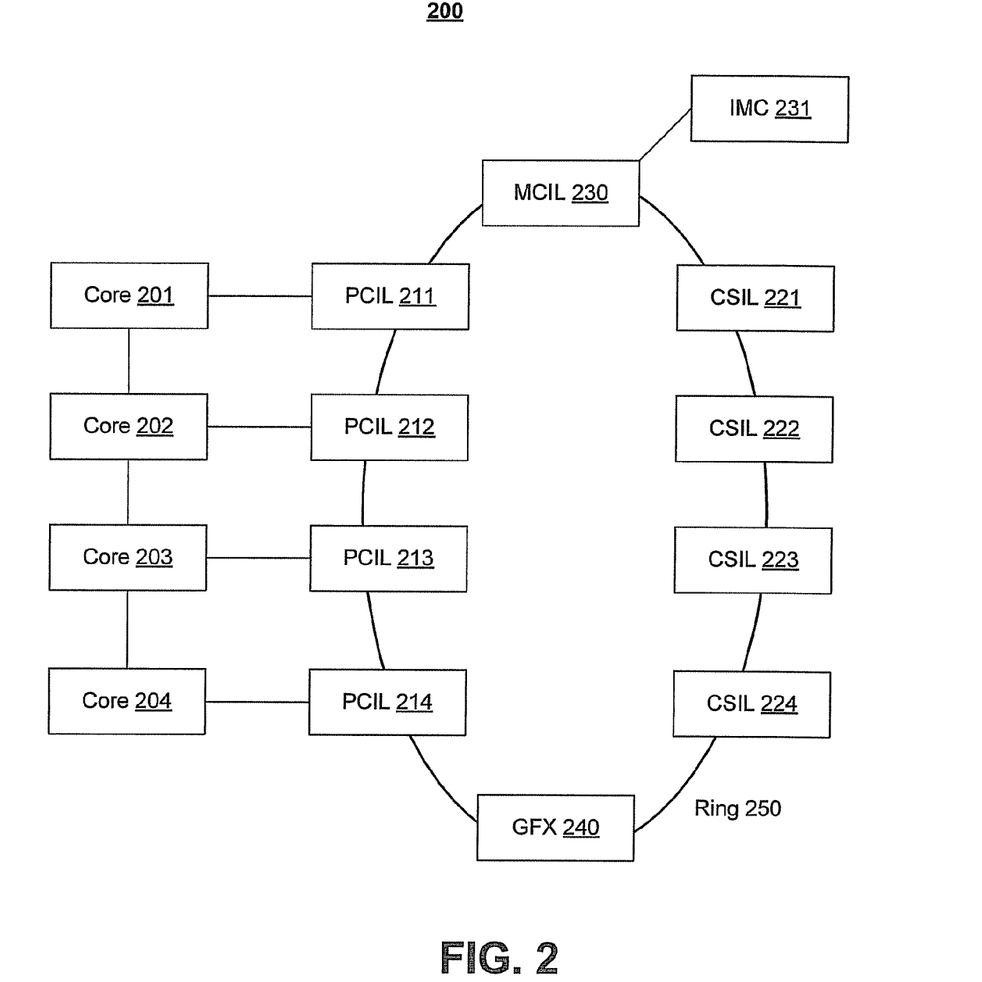
FIG. 2 illustrates on-core memory interface logic according to an embodiment.

In one embodiment, caching agents 221-224 are each to manage a slice of a physically distributed cache. As an example, each cache component, such as component 221, is to manage a slice of a cache for a co-located core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache.

As described above, binary code may be translated by a software binary optimizer to potentially optimize the execution of the binary code. When binary translation is performed, memory operations may be reordered within transactional regions of code. As a result, reordered loads and stores need to be checked at run time to ensure that data dependency relationships have not been violated. For example, a load and store to the same memory address may have to executed in the same sequence in the reordered code as in the code prior to the reordering. Similarly, two stores to the same memory address may have to executed in the same sequence in the reordered code as in the code prior to the reordering. However, software is often unable to detect a case where two different virtual/physical addresses are utilized, but the two different virtual/physical addresses reference the same physical address space. Consequently, during optimization, software reorders a load or store to different virtual/physical addresses that map to the same physical address. Reordering of memory operations as discussed above potentially may result in invalid data/execution. To avoid such situations, hardware may perform memory alias checking to ensure that reordered memory operations do not violate data dependency relationships.

Figure 3:
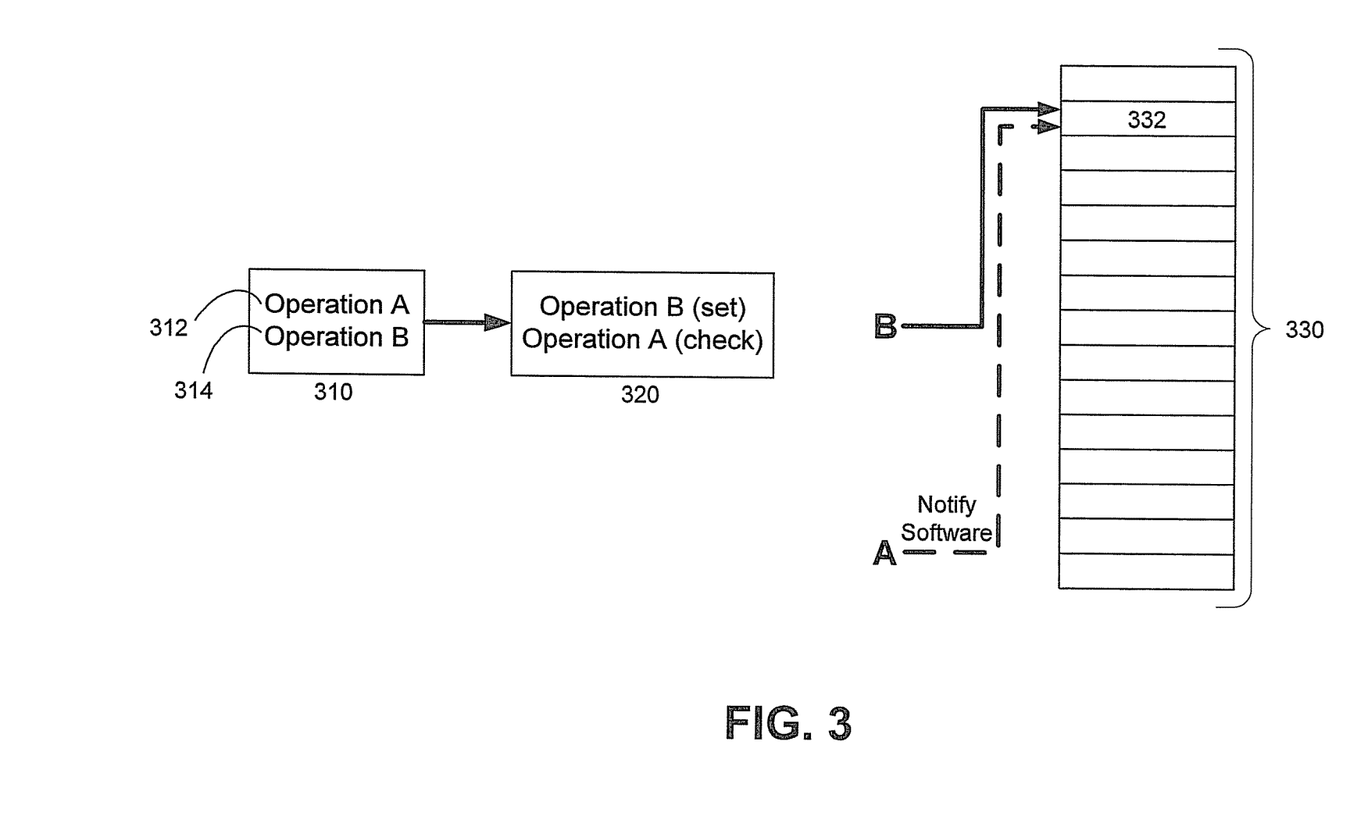
FIG. 3 illustrates memory alias checking according to an embodiment.

FIG. 3 illustrates memory alias checking according to an embodiment. Software may reorder a sequence of memory operations from a region of code 310. The region of code 310 may be a transactional region. The sequence of memory operations within the region of code 310 may include two or more operations which have to be performed in a particular order if the two operations utilize the same memory address. In an example embodiment, memory operation A 312 may be a store operation to memory address A and memory operation B 314 may be a store operation to memory address B. However, the software may not be able to resolve whether memory address A and memory address B reference the same physical memory address.

The region of code 320 with reordered memory operations may order the memory operations such that store operation B is executed before store operation A. When the memory operations have been reordered, the software may inform the hardware, for example, via a prefix, that further processing is necessary during the execution of operations A and B. The information may include one of two possible indicators: an indicator indicating that the physical memory address accompanying the indicator has to be inserted into a hardware data structure 330 such as a lookup table, or an indicator indicating that the physical memory address accompanying the indicator has to be checked against the data structure 330 to determine whether there is already an existing entry for that particular memory address. The indicators may be referred to as a "set" indicator and a "check" indicator respectively.

As shown, the software may prefix operation B with a set prefix and operation A with a check prefix. When the hardware encounters operation B, the hardware may determine the physical memory address associated with operation B and insert the physical memory address into, for example, entry 332 in the lookup table 330. Next, when the hardware encounters operation A, the hardware may determine the physical memory address associated with operation A and may check whether the memory address is present in lookup table 330. If the address associated with operation A is already in the lookup table, the hardware may indicate to the software that a data dependency relationship has been violated. For example, if the address associated with operation A resolves to the same address associated with operation B, a data dependency relationship violation has occurred since two store operations to the same memory address cannot be reordered. Therefore, in such a case, the hardware will find the entry 332 already populated in the lookup table 330, and may notify software about the data dependency relationship violation. In response to the notification, necessary actions such as aborting the execution of the associated transactional code region may be taken.

A problem with the above approach is that the hardware table 330 may consume significant amounts of space and power. Another problem is that the memory operations with set and check prefixes need to be processed in program order. In certain situations, load operations and store operations may be fed via different buffers to hardware for parallel execution. Typically, there may be a single dedicated store buffer which maintains the order of store operations. However, load operations may be fed via multiple dedicated load buffers to hardware for execution. The operations on different load buffers may be executed at different speeds, and as a result, the load operations may not be executed in a particular order. Hence, the execution ordering of a store operation is maintained relative to another store operation, but the execution ordering of a load operation is not necessarily (and often will not be) maintained relative to another store or load operation.

Figure 4:
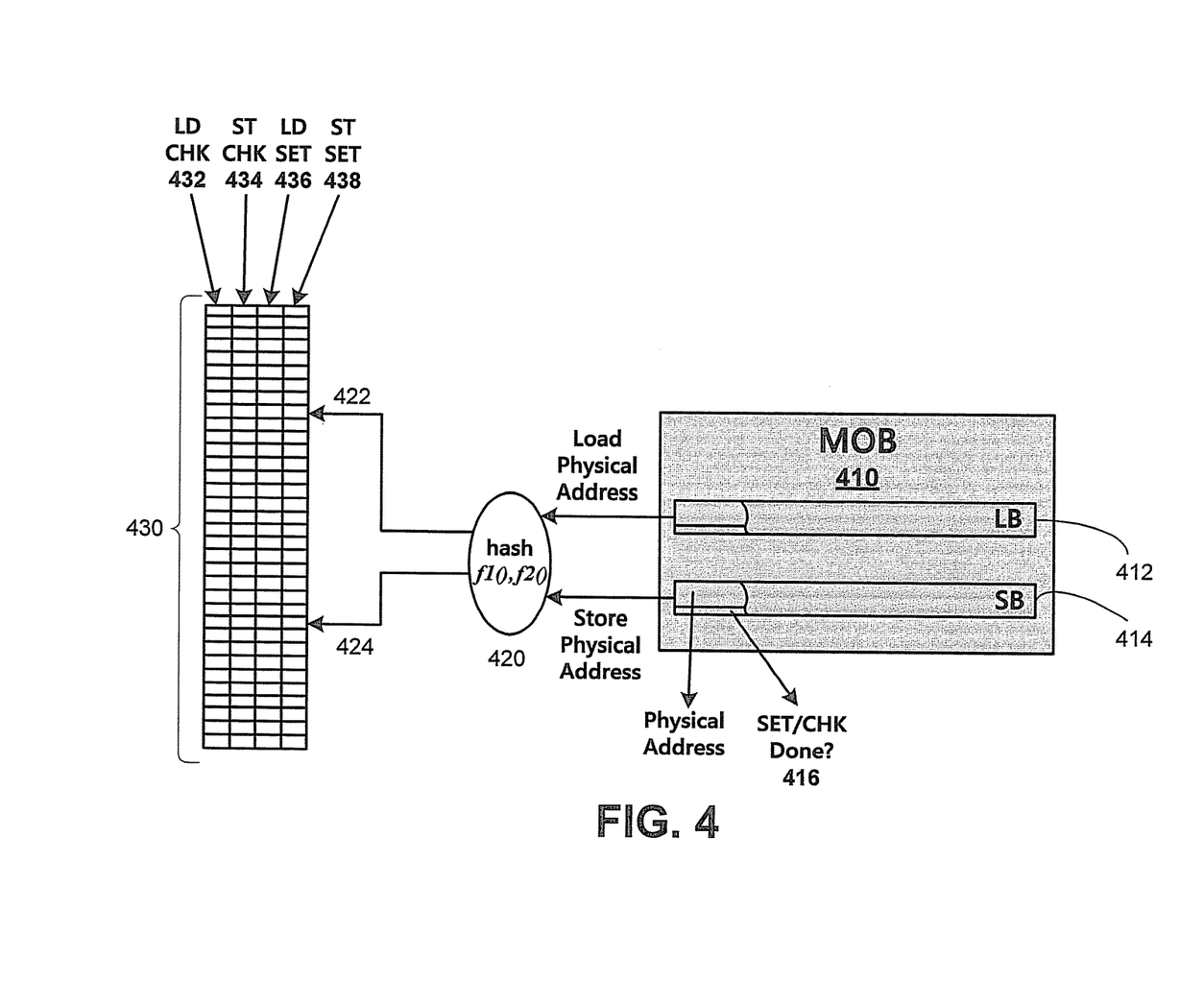
FIG. 4 illustrates memory alias checking according to an embodiment.

FIG. 4 illustrates memory alias checking according to an embodiment. In an embodiment, hardware may perform memory alias checking efficiently in an environment where parallel processing of loads relative to stores and loads relative to other loads is possible. Hardware may process operations associated with physical addresses from a memory order buffer 410 (MOB). The MOB 410 may include a store buffer 414 and one or more load buffers 412. For each load/store the hardware may hash the memory address associated with the load/store to obtain and/or record state information pertaining to the memory address. State information about the memory address may be maintained and accumulated in a data structure 430 such as a hash table. In an embodiment, the data structure 430 may be implemented via hardware. In an embodiment, the data structure 430 may be implemented using one or more bloom filters. The data structure 430 may include indicators indicating whether executed instructions associated with a memory address were loads or stores and whether the software signaled that the associated load/store instructions were sets or checks. In an embodiment, the data structure 430 may include four bits for each entry corresponding to memory addresses: a first bit 432 to indicate whether a memory address was associated with a load instruction to be checked (load check), a second bit 434 to indicate whether the memory address was associated with a store check, a third bit 436 to indicate whether the memory address was associated with a load set, and a fourth bit 438 to indicate whether the memory address was associated with a store set.

State information for a memory address may be accumulated in the data structure 430 as instructions associated with that memory address are executed. For example, initially, if a load check instruction associated with memory address X is executed, the entry in data structure 430 corresponding to memory address X may indicate 1000 since the load check bit 432 for that entry may be set. If a store check instruction associated with the same memory address X is subsequently executed, the entry corresponding to memory address X may indicate 1100 since the previously modified load check bit 432 remains unchanged and the store check bit 434 may be set. If another store check instruction associated with the same memory address X is subsequently executed, the entry corresponding to memory address X may still indicate 1100 since the store check bit 434 has already been set. In such a manner, state information associated with the memory address X may be accumulated as instructions associated with memory address X are executed.

Based on the accumulated state information of a memory address, the hardware may signal whether a data dependency relationship violation occurred. In an embodiment, in response to a signal indicating that a data dependency relationship violation occurred, the hardware and/or software may abort the entire transactional region of code encompassing the failed load/store instruction.

Figure 5:
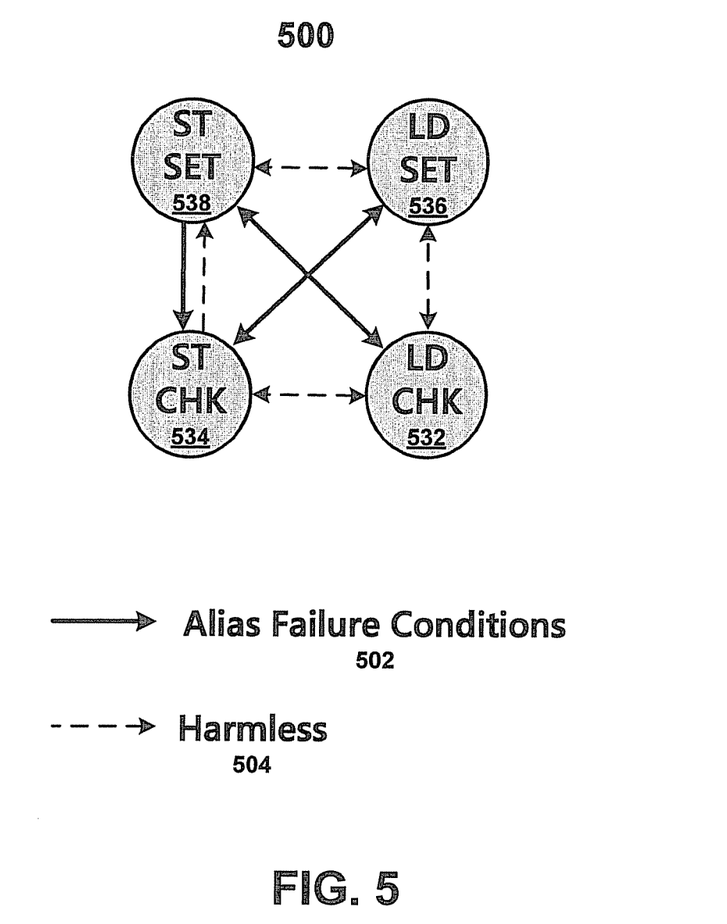
FIG. 5 illustrates a state transition diagram to determine data dependency relationship violations according to an embodiment.

FIG. 5 illustrates a state transition diagram 500 to determine data dependency relationship violations according to an embodiment. When an instruction associated with a physical memory address is processed by hardware, information indicating whether the processed instruction is a load or a store and whether the instruction is a set or a check (i.e., a current state associated with the memory address) may be accumulated with the previously accumulated states associated with that particular memory address in a data structure such as data structure 430 discussed above. The memory address' current state may be a store set 538, a load set 536, a store check 534, or a load check 532 as explained above. Based on the entry corresponding to a memory address in the data structure 430, the hardware may determine whether a transition from previously accumulated states associated with that memory address to the current state represents a failure condition. If a state transition representing a failure condition is encountered, the hardware may signal that a data dependency relationship violation has occurred. If a state transition which does not represent a failure condition (i.e., a harmless state transition) is encountered, the hardware may accumulate the current state associated with the memory address to the previously accumulated states associated with the memory address in the data structure 430 and continue processing more load/store instructions.

State transitions representing failure conditions are illustrated by solid arrows 502 and harmless state transitions are illustrated by dashed arrows 504. In an embodiment, state transitions from a previously accumulated store set 538 to a load set 536 are harmless. State transitions from a previously accumulated load set 536 to a store set 538 are harmless. Similarly, state transitions from a previously accumulated store check 534 to a load check 532 and state transitions from a previously accumulated load check 532 to a store check 534 are harmless. Since loads may be reordered relative to other loads, state transitions from a previously accumulated load check 532 to a load set 536 and state transitions from a previously accumulated load set 536 to a load check 532 are harmless.

Since store instructions are processed in the order relative to other stores, state transitions from a previously accumulated store check 534 to a store set 538 are harmless, but state transitions from a previously accumulated store set 538 to a store check 534 represent failure conditions. State transitions from a previously accumulated store set 538 to a load check 532, and a previously accumulated load set 536 to a store check 534 are failure conditions. As explained previously, load and store instructions may not be processed in order, and therefore, state transitions from a previously accumulated store check 534 to a load set 536, and a previously accumulated load check 532 to a store set 538 are also failure conditions.

Returning to FIG. 4, in an embodiment, at the start of execution of a transactional region of code, the data structure 430 may be reset. For example, the four bits 432, 434, 436, and 438 may be reset for every entry in the data structure 430. In an embodiment, a global reset to clear all bits in the data structure 430 may be implemented directly in hardware. In certain situations, a subset of instructions from a transactional region of code may be processed and the software may reorder the remaining instructions in the transactional region of code. In an embodiment, the data structure 430 may be reset when the remaining instructions from the transactional region of code are reordered to further reduce the possibility of collisions in the data structure 430.

In an embodiment, a "done" bit 416 may be used to indicate addresses which have been processed by the hardware so that the addresses are processed exactly once.

A single hash function may hash one or more memory addresses to the same location in the data structure 430. In an embodiment, to reduce these occurrences, multiple hash functions may be utilized. For example, when a physical address is processed from the MOB 410 as described above, the physical address may be hashed utilizing two hash functions 420, f1( ) and f2( ). The resulting hashes may likely point to two different locations 422 and 424 in the data structure 430. Therefore, any state information pertaining to the memory address may be retrieved/accumulated from/in both locations 422 and 424. In an embodiment, the hardware may only signal that a data dependency relationship violation occurred if the state information from both locations 422 and 424 indicate a failed state. In another embodiment, as a more conservative approach, the hardware may signal that a data dependency relationship violation occurred if the state information from either locations 422 and 424 indicate a failed state.

Figure 6:
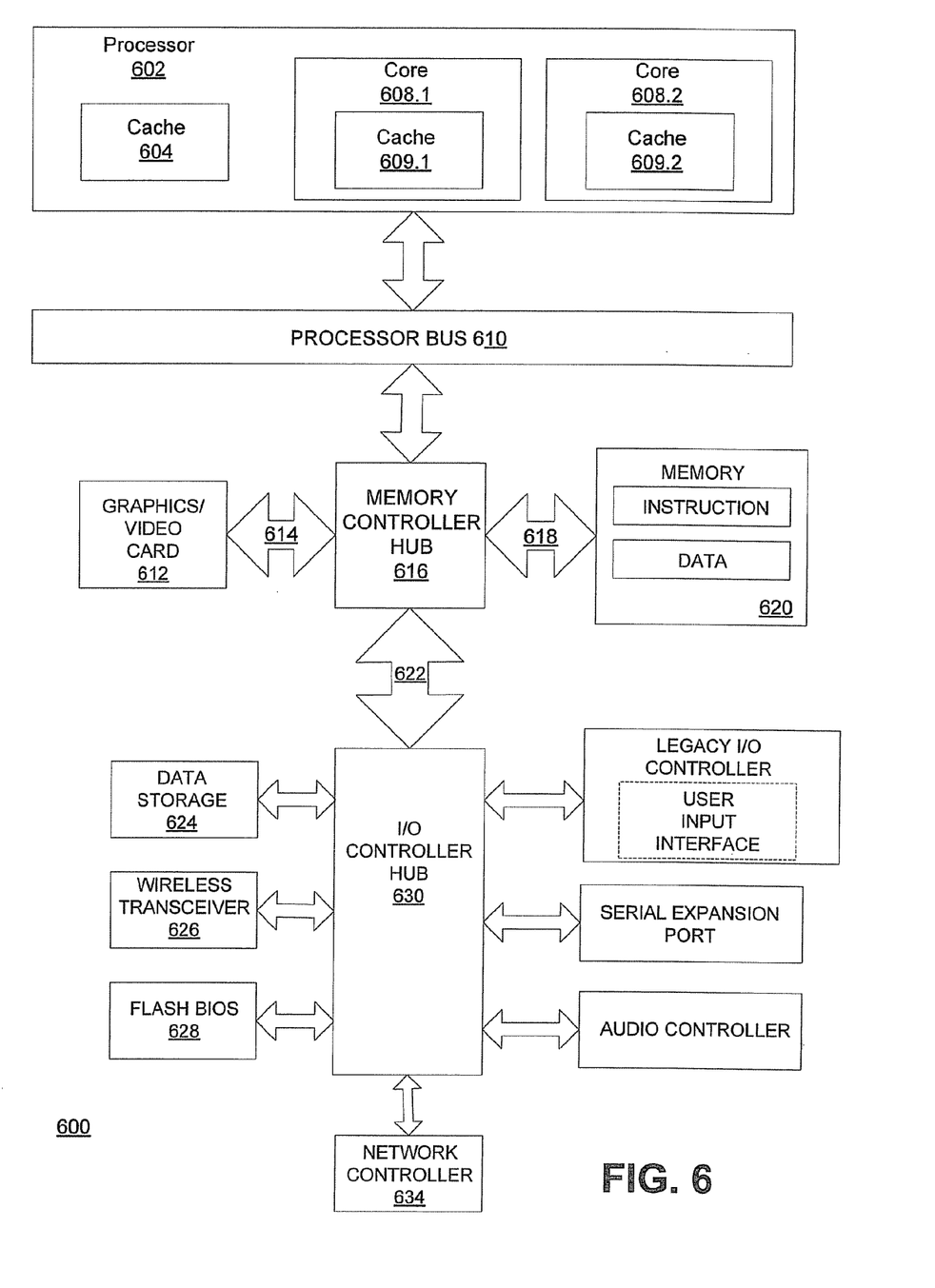
FIG. 6 is a block diagram of an exemplary computer system according to an embodiment.

FIG. 6 is a block diagram of an exemplary computer system 600 formed with a processor 602 that includes one or more cores 608 (e.g., cores 608.1 and 608.2). Each core 608 may execute an instruction in accordance with one embodiment of the present invention. System 600 includes a component, such as a processor 602 to employ execution units including logic to perform algorithms for process data, in accordance with the present invention. System 600 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 600 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment of the system 600 may be described in the context of a single processor desktop or server system, but alternative embodiments can be included in a multiprocessor system. System 600 may be an example of a 'hub' system architecture. The computer system 600 includes a processor 602 to process data signals. The processor 602 can be a complex instruction set computer (CISC) microprocessor, a reduced instruction set computing (RISC) microprocessor, a very long instruction word (VLIW) microprocessor, advanced vector extensions (AVX) microprocessor, streaming single instruction multiple data extensions (SSE) microprocessor, a processor implementing a combination of instruction sets, or any other processor device, such as a digital signal processor, for example. The processor 602 is coupled to a processor bus 610 that can transmit data signals between the processor 602 and other components in the system 600. The elements of system 600 perform their conventional functions that are well known to those familiar with the art.

Depending on the architecture, the processor 602 can have a single internal cache or multiple levels of internal cache. Alternatively, in another embodiment, the cache memory can reside external to the processor 602. Other embodiments can also include a combination of both internal and external caches depending on the particular implementation and needs. In one embodiment, the processor 602 may include a Level 2 (L2) internal cache memory 604 and each core (e.g., 608.1 and 608.2) may include a Level 1 (L1) cache (e.g., 609.1 and 609.2, respectively). In one embodiment, the processor 602 may be implemented in one or more semiconductor chips. When implemented in one chip, all or some of the processor 602's components may be integrated in one semiconductor die.

Each of the core 608.1 and 608.2 may also include respective register files (not shown) that can store different types of data in various registers including integer registers, floating point registers, status registers, and instruction pointer register. Each core 608 may further include logic to perform integer and floating point operations.

The processor 602 also includes a microcode (ucode) ROM that stores microcode for certain macroinstructions. For one embodiment, each core 608 may include logic to handle a packed instruction set (not shown). By including the packed instruction set in the instruction set of a general-purpose processor 602, along with associated circuitry to execute the instructions, the operations used by many multimedia applications may be performed using packed data in a general-purpose processor 602. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of the processor 602 can also be used in micro controllers, embedded processors, graphics devices, DSPs, and other types of logic circuits. System 600 includes a memory 620. Memory 620 can be a dynamic random access memory (DRAM) device, a static random access memory (SRAM) device, flash memory device, or other memory device. Memory 620 can store instructions and/or data represented by data signals that can be executed by the processor 602.

A system logic chip 616 is coupled to the processor bus 610 and memory 620. The system logic chip 616 in the illustrated embodiment is a memory controller hub (MCH). The processor 602 can communicate to the MCH 616 via a processor bus 610. The MCH 616 provides a high bandwidth memory path 618 to memory 620 for instruction and data storage and for storage of graphics commands, data and textures. The MCH 616 is to direct data signals between the processor 602, memory 620, and other components in the system 600 and to bridge the data signals between processor bus 610, memory 620, and system I/O 622. In some embodiments, the system logic chip 616 can provide a graphics port for coupling to a graphics controller 612. The MCH 616 is coupled to memory 620 through a memory interface 618. The graphics card 612 may be coupled to the MCH 616 through an Accelerated Graphics Port (AGP) interconnect 614.

System 600 uses a proprietary hub interface bus 622 to couple the MCH 616 to the I/O controller hub (ICH) 630. The ICH 630 provides direct connections to some I/O devices via a local I/O bus. The local I/O bus is a high-speed I/O bus for connecting peripherals to the memory 620, chipset, and processor 602. Some examples are the audio controller, firmware hub (flash BIOS) 628, wireless transceiver 626, data storage 624, legacy I/O controller containing user input and keyboard interfaces, a serial expansion port such as Universal Serial Bus (USB), and a network controller 634. The data storage device 624 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

A value, as used herein, includes any known representation of a number, a state, a logical state, or a binary logical state. Often, the use of logic levels, logic values, or logical values is also referred to as 1s and 0s, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   maintaining, in a data structure, a previous state of a memory address, wherein the previous state represents whether a last instruction, which was associated with the memory address and which has been executed, was one of a load instruction and a store instruction and whether the last instruction was accompanied by one of a set indicator and a check indicator;
   identifying a current state of the memory address, wherein the current state represents whether a current instruction, which is associated with the memory and which has not been executed, is one of a load instruction and a store instruction, and whether the current instruction is accompanied by one of a set indicator and a check indicator;
   comparing the current state with the previous state to detect an aliasing of the memory address; and
   signaling a data dependency relationship violation if the aliasing of the memory address is detected.

2. The method of claim 1, further comprising:
   if the aliasing of the memory address is not detected, executing the current instruction and updating the previous state in the data structure with the current state.

3. The method of claim 1, wherein the aliasing of the memory address is detected if:
   the previous state represents the last instruction as being a store instruction accompanied by a set indicator, and
   the current state represents the current instruction as being a store instruction accompanied by a check indicator.

4. The method of claim 1, wherein the aliasing of the memory address is detected if:
   the previous state represents the last instruction as being a store instruction accompanied by a set indicator, and the current state represents the current instruction as being a load instruction accompanied by a check indicator.

5. The method of claim 1, wherein the aliasing of the memory address is detected if:
the previous state represents the last instruction as being a load instruction accompanied by a check indicator, and
the current state represents the current instruction as being a store instruction accompanied by a set indicator.

6. The method of claim 1, wherein the aliasing of the memory address is detected if:
the previous state represents the last instruction as being a store instruction accompanied by a check indicator, and
the current state represents the current instruction as being a load instruction accompanied by a set indicator.

7. The method of claim 1, wherein the aliasing of the memory address is detected if:
the previous state represents the last instruction as being a load instruction accompanied by a set indicator, and
the current state represents the current instruction as being a store instruction accompanied by a check indicator.

8. An apparatus comprising:
a processor to execute computer instructions, wherein the processor is configured to:
maintain, in a data structure, a previous state of a memory address, wherein the previous state represents whether a last instruction, which was associated with the memory address and which has been executed, was one of a load instruction and a store instruction and whether the last instruction was accompanied by one of a set indicator and a check indicator;
identify a current state of the memory address, wherein the current state represents whether a current instruction, which is associated with the memory and which has not been executed, is one of a load instruction and a store instruction, and whether the current instruction is accompanied by one of a set indicator and a check indicator;
compare the current state with the previous state to detect an aliasing of the memory address; and
signal a data dependency relationship violation if the aliasing of the memory address is detected.

9. The apparatus of claim 8, wherein the processor is further configured to:
if the aliasing of the memory address is not detected, execute the current instruction and update the previous state in the data structure with the current state.

10. The apparatus of claim 8, wherein the processor is configured to detect the aliasing of the memory address if:
the previous state represents the last instruction as being a store instruction accompanied by a set indicator, and
the current state represents the current instruction as being a store instruction accompanied by a check indicator.

11. The apparatus of claim 8, wherein the processor is configured to detect the aliasing of the memory address if:
the previous state represents the last instruction as being a store instruction accompanied by a set indicator, and
the current state represents the current instruction as being a load instruction accompanied by a check indicator.

12. The apparatus of claim 8, wherein the processor is configured to detect the aliasing of the memory address if:
the previous state represents the last instruction as being a load instruction accompanied by a check indicator, and
the current state represents the current instruction as being a store instruction accompanied by a set indicator.

13. The apparatus of claim 8, wherein the processor is configured to detect the aliasing of the memory address if:
the previous state represents the last instruction as being a store instruction accompanied by a check indicator, and
the current state represents the current instruction as being a load instruction accompanied by a set indicator.

14. The apparatus of claim 8, wherein the processor is configured to detect the aliasing of the memory address if:
the previous state represents the last instruction as being a load instruction accompanied by a set indicator, and
the current state represents the current instruction as being a store instruction accompanied by a check indicator.

15. A non-transitory machine-readable medium having stored thereon an instruction, which if performed by a machine causes the machine to perform a method comprising:
maintaining, in a data structure, a previous state of a memory address, wherein the previous state represents whether a last instruction, which was associated with the memory address and which has been executed, was one of a load instruction and a store instruction and whether the last instruction was accompanied by one of a set indicator and a check indicator;
identifying a current state of the memory address, wherein the current state represents whether a current instruction, which is associated with the memory and which has not been executed, is one of a load instruction and a store instruction, and whether the current instruction is accompanied by one of a set indicator and a check indicator;
comparing the current state with the previous state to detect an aliasing of the memory address; and
signaling a data dependency relationship violation if the aliasing of the memory address is detected.

16. The machine-readable medium of claim 15, the method further comprising:
if the aliasing of the memory address is not detected, executing the current instruction and updating the previous state in the data structure with the current state.

17. The machine-readable medium of claim 15, wherein the aliasing of the memory address is detected if:
the previous state represents the last instruction as being a store instruction accompanied by a set indicator, and
the current state represents the current instruction as being a store instruction accompanied by a check indicator.

18. The machine-readable medium of claim 15, wherein the aliasing of the memory address is detected if:
the previous state represents the last instruction as being a store instruction accompanied by a set indicator, and
the current state represents the current instruction as being a load instruction accompanied by a check indicator.

19. The machine-readable medium of claim 15, wherein the aliasing of the memory address is detected if:
the previous state represents the last instruction as being a load instruction accompanied by a check indicator, and
the current state represents the current instruction as being a store instruction accompanied by a set indicator.

20. The machine-readable medium of claim 15, wherein the aliasing of the memory address is detected if:
the previous state represents the last instruction as being a store instruction accompanied by a check indicator, and
the current state represents the current instruction as being a load instruction accompanied by a set indicator.

21. The machine-readable medium of claim 15, wherein the aliasing of the memory address is detected if:
the previous state represents the last instruction as being a load instruction accompanied by a set indicator, and the current state represents the current instruction as being a store instruction accompanied by a check indicator.

* * * * *